(12) United States Patent
Haney

(10) Patent No.: US 7,111,163 B1
(45) Date of Patent: Sep. 19, 2006

(54) WIDE AREA NETWORK USING INTERNET WITH QUALITY OF SERVICE

(75) Inventor: Richard D. Haney, Union City, CA (US)

(73) Assignee: AlterWAN, Inc., Union City, CA (US)

( * ) Notice: Subject to any disclaimer, the term of this patent is extended or adjusted under 35 U.S.C. 154(b) by 1040 days.

(21) Appl. No.: 09/613,004

(22) Filed: Jul. 10, 2000

(51) Int. Cl.
*H04L 9/10* (2006.01)

(52) U.S. Cl. ............... 713/153; 709/227; 709/240; 726/3; 726/15

(58) Field of Classification Search ........... 713/153, 713/154
See application file for complete search history.

(56) References Cited

U.S. PATENT DOCUMENTS

| | | | | |
|---|---|---|---|---|
| 5,805,803 A | * | 9/1998 | Birrell et al. | 713/201 |
| 5,826,029 A | * | 10/1998 | Gore et al. | 709/227 |
| 5,898,830 A | * | 4/1999 | Wesinger et al. | 713/201 |
| 6,173,399 B1 | * | 1/2001 | Gilbrech | 713/153 |
| 6,178,505 B1 | * | 1/2001 | Schneider et al. | 713/168 |
| 6,226,748 B1 | * | 5/2001 | Bots et al. | 713/201 |
| 6,493,342 B1 | * | 12/2002 | Breslow et al. | 370/394 |
| 6,519,636 B1 | * | 2/2003 | Engel et al. | 709/223 |
| 6,557,037 B1 | * | 4/2003 | Provino | 709/227 |

* cited by examiner

*Primary Examiner*—Ayaz Sheikh
*Assistant Examiner*—Syed A. Zia
(74) *Attorney, Agent, or Firm*—Schwegman, Lundberg, Woessner & Kluth, P.A.

(57) ABSTRACT

A wide area network using the internet as a backbone utilizing specially selected ISX/ISP providers whose routers route AlterWAN packets of said wide area network along private tunnels through the internet comprised of high bandwidth, low hop-count data paths. Firewalls are provided at each end of each private tunnel which recognize IP packets addressed to devices at the other end of the tunnel and encapsulate these packets in other IP packets which have a header which includes as the destination address, the IP address of the untrusted side of the firewall at the other end of the tunnel. The payload sections of these packets are the original IP packets and are encrypted and decrypted at both ends of the private tunnel using the same encryption algorithm using the same key or keys.

9 Claims, 3 Drawing Sheets

WIDE AREA NETWORK USING INTERNET WITH QUALITY OF SERVICE

FIELD OF USE AND BACKGROUND OF THE INVENTION

The invention is useful in providing wide area networking services to clients with many locations among which data, especially high volumes of data, must be sent.

The prior art of WANs include frame relay and point-to-point networking offered by telephone companies. One type of Wide Area Network (WAN) service provided by telephone companies is leased lines. These may be analog or digital and are provide typically by a Local Exchange Carrier (LEC) on an intraLATA basis (Local Access and Transport Area). InterLATA leased lines are also available but must be provided by an Interexchange Carrier (IXC) with the LEC providing the local loop connection.

Another such WAN service is known as a Virtual Private Network. A VPN is intended for use by very large organizations with multiple locations. A VPN appears to the user as if it was private leased line trunk network, but it is not. VPN services are generally arranged with an Interexchange Carrier (IXC) with the points of the network termination (locations from which data will be sent and received being identified along with the level of bandwidth required at each termination. Dedicated circuits (telephone lines) are established between each network termination and the closest capable IXC POP (Point of Presence). Connections between POPs are not dedicated but are established by routers using routing tables to route the traffic over specified high-capacity transmission facilities on a priority basis to ensure the level of service provided is adequate and equivalent to a true private network using leased lines.

Other forms of Public Data Networks include: DDS, Switched 56 Kbps; Digital T-Carrier Systems; Digital 800 Services; X.25 Packet Switched Services; Broadband Data Networking such as Frame Relay and Cell Switching, ADSL, HDSL, Sonet, Switched Megabit Data Services, ISDN and Advanced Intelligent Networks.

Dataphone Digital Service (DDS) which was introduced by AT&T in 1974 and is generally end-to-end, fully digital, dedicated service provided my most carriers. DDS may be either point-to-point or multipoint. A head end Front End Processor controls all access to the network by polling remote devices. All communication must pass through the head end. DDS signals are carried within logical channels on T1 lines.

Switched 56 Kbps is a circuit switched (rather than dedicated line) digital service that serves the same applications as DDS although it is more cost effective for lower data volumes. All the components are the same as DDS but digital local loops and digital carrier exchanges are used. The main difference over DDS is that traffic is routed using a logical address which is the equivalent of a voice telephone number. The circuit is set up, maintained and torn down much like a voice call is switched and pricing is similar. The cost is sensitive to distance, duration, time of day and day of the year.

Digital T-carrier systems (including fractional T1 service) are dedicated links carry digital data over multiple logical channels on a single physical communication circuit with the logical channels established by time division multiplexing.

Digital 800 service was introduced in 1994 by AT&T and is intended for medium to high volume customers subscribing to high volume 800 service offerings.

X.25 packet switching was invented in the early 60's and was implemented on ARPANET in 1971. X.25 is a dial up service as is ISDN and Switched 56/64 Kbps WANS, and, as such, is not suitable for dedicated WANs such as the WANs in the AlterWAN™ network genus of the invention. The basic concept of packet switching provides a highly flexible, shared network in support of interactive computer communications in a WAN. Prior to packet switching, users spread over a wide area with only infrequent traffic had no cost effective way of sharing computer resources. Asynchronous communications are bursty in nature and send only small amounts of data with lots of idle time between bursts. Having dedicated lines for such communication is a waste of bandwidth and expensive. Packet switching solved those problems by providing connections as needed which were billed on the number of packets transmitted. Packet switching also improved the error performance. Typically a packet switched network uses a dial up connection to a packet switching node. Once the connection to packet switching node is made, a control packet is sent to establish the session with the target host. The control packet is forwarded across the most direct link that is available in a number of hops between nodes. The target host responds with a control packet sent back to the source to establish the session. Each packet is numbered sequentially and transmitted. ISDN is an entirely digital suite of dial-up data communication services delivered over the twisted pair local loop. ISDN lines have B channels that carry information, D-channels that carry data for signalling and control, H-channels that carry high speed data for bandwidth intensive applications. It has been a commercial failure.

Frame relay networks were first deployed in the mid 90's and is somewhat like packet switching in that each frame is individually addressed. Frame relay makes use of special switches and a shared network of very high speed. Unlike packet switching, frame relay supports the transmission of virtually any computer data stream. Frames are variable in length up to 4096 bytes. Frame relay is data oriented and does not support voice or video very well. As is the case for X.25 packet switching, frame relay overhead is high and delays in transmission are expected. Further, network congestion can result in loss of data. Although frame relay networks appear to the customer to be one-hop networks, they really are not one hop nets. There are many links between multiple Central Office (CO) switches inside the typical frame relay cloud. Each hop adds latency and the possibility of running into bandwidth congestion. Further, frame relay networks cannot cross telephone company boundaries so all sites on a frame relay WAN must be using the same frame relay provider, i.e., it not possible for some sites to be coupled to AT&T frame relay COs and other sites to be coupled to MCI or Spring COs. Every frame has a DLCI code in the header that identifies the customer and the virtual data path through a particular telephone company for the traffic. Therefore, it is not possible to mix frames with different DLCIs because different telco DLCIs have different formats and that will disrupt the routing process for such frames through the CO switches. If two locations on a frame relay network cannot both be served by the same frame relay provider, a second frame relay cloud must be built and the two clouds connected together by two routers at some common location that can be coupled to both clouds with the two routers coupled together by a local area network.

Cell switching has been conventionally thought to be the future of data communication networks. Cell switching encompasses both ATM networks and Switched Multimegabit Data Service (SMDS). Data is organized into cells of fixed length of 53 octets and are shipped across high speed facilities and switched in high speed, specialized switches. ATM is primarily data oriented, but is supports voice and video effectively. Cell switching is high cost and has high overhead and suffers from a lack of fully developed standards. ATM networks are also not widely commercially available yet.

The problem with all these approaches is that they are expensive with recurring telephone company charges.

The internet as a backbone has recently loomed as a possibility for implementing wide area networks and lowering the cost. However, there are several problems with using the internet as a WAN backbone. Generally, these problems all relate to quality of service. Quality of service has to do with both errors in transmission as well as latency. Latency or delay on critical packets getting from source to destination can seriously slow or disrupt operations of computer systems. Latency can also destroy the efficacy of streaming video, streaming audio and streaming multimedia product and service delivery by causing visible and/or audible gaps in the presentation of the program encoded in the data to the user or freezes. This can be very distracting and undesirable in, for example, video conferences, video-on-demand, telephone calls etc. Latency is also a problem when large documents are being downloaded because it slows the process considerably. Latency arises from multiple hops between nodes on the internet coupling the source to the destination.

Prior art attempts to use the internet as a backbone did not control the number of hops and available bandwidth in the data path from source to destination. As a result the number of router hops along the route and the lack of available bandwidth precluded the use of the internet as a viable private network backbone alternative. ISP's built local businesses without regard to the customers regional, national or international presence as there objective was only to offer LOCAL internet access. This resulted in attempts to use the internet as an alternative private network backbone of routes that may have few hops or many hops. Routes that may have inadequate bandwidth for the worst case bandwidth requirement of a WAN were sometimes picked and that resulted in failure. This uncontrolled hop count, and lack of control of the data paths and the available bandwidth and the resulting latency caused problems in implementing WANs on the internet.

Another major problem with using the internet as a backbone is security or privacy. Since the internet is a public facility, private and sensitive data transmitted over the internet is subject to snooping.

Thus, there has arisen a need for a system which can use the internet as a WAN backbone to help decrease the costs of data transport while not suffering from the aforementioned latency, privacy and bandwidth availability problems.

SUMMARY OF THE INVENTION

The wide area network technology described herein (referred to as AlterWAN™ network) is an alternative wide area network that uses the internet as a backbone with any telephone company providing the local loop connection to the first participating ISX/ISP and any telephone company providing a local loop connection from the endpoint participating ISX/ISP to the destination router. This greatly reduces monthly costs to customers and removes the frame relay restriction that the same telephone company must provide all data paths including the local loops at both ends. High quality of service is maintained by mimicking the "one hop" private network structures of prior art frame relay and point-to-point networks. Any WAN that uses the internet as a backbone and mimics the "one hop" structure of private frame relay and point-to-point networks by any means is within the genus of the invention.

A key characteristic that all species within the genus of the invention will share is a tuning of the internet network routing process by proper ISX selection to reduce the hop count thereby reducing the latency problem that has plagued prior failed attempts to use the internet as a WAN backbone.

Another key characteristic that all species within the genus of the invention will share is the transmission of secure encrypted data along preplanned high bandwidth, low hop-count routing paths between pairs of customer sites that are geographically separated. The encrypted AlterWAN data is sent through a high bandwidth, dedicated local loop connection to the first participating AlterWAN ISX/ISP facility. There, the AlterWAN packets are routed to the routers of only preselected ISX facilities on the internet. The preselected ISX/ISP facilities are ones which provide high-bandwidth, low hop-count data paths to the other ISX/ISP facilities along the private tunnel. The routers of these participating ISX/ISP facilities are specially selected to provide these high-bandwidth, low hop-count data paths either by their natural routing tables or by virtue of special routing tables that these ISX/ISP providers establish to route AlterWAN packets through high-bandwidth, low hop-count paths and route other internet traffic along other paths. For example, if a customer site in San Jose needs to have AlterWAN service to another site in Tokyo, a "private tunnel" is built in each direction through the internet and two dedicated local loops, one at each end are established to connect the two customer sites to the first and last participating ISX providers in the private tunnel. Data security is implemented by the use of conventional or custom firewall/VPN technology. At each customer site, a firewall/VPN device is configured to securely encrypt the payload of each AlterWAN packet to be sent through a "private tunnel" to the far end customer site where the payload is decrypted. Using conventional firewalls, the encryption method and the encryption keys used at both ends for transmissions in both directions are the same. However, the invention also contemplates using one encryption algorithm and encryption key or keys for downstream transmissions and another encryption method and different key or keys for the upstream direction. This method may require the use of custom designed firewalls. Whichever method is used, the firewalls at both ends use the same encryption method and key or keys for encryption of packets at the source and decryption of them at the destination by predetermined configurations that are programmed into the firewalls. Only packets identified at the source end firewall with a destination IP address at the other end of an AlterWAN "private tunnel" have the payload of the packet encrypted before being sent. Once they are encrypted, they are sent across the preplanned route to the destination where the far end firewall recognizes the IP address of the packet as being addressed to it. Only those packets are decrypted and transmitted to the device to which they are addressed and other packets that are not AlterWAN packets are either rejected or routed to some other device which is not part of the AlterWAN network.

In other words, the quality of service problem that has plagued prior attempts is solved by providing non-blocking bandwidth (bandwidth that will always be available and will always be sufficient) and predefining routes for the "private tunnel" paths between points on the internet between ISX facilities. Participating ISX facilities agree to provide non-blocking bandwidth between their sites. By having private tunnels to each location of a worldwide company for example, an engineer in San Jose can connect directly to a LAN at a branch office in Paris and "see" on his/her computer's desktop all the shared items on the Paris LAN such as various servers, printers etc.

This preplanning of the routing path causes traffic from AlterWAN™ customers to be transmitted quickly and without delay from end to end and not experience delays due to lack of bandwidth or excessive hop count. Because the packet payload is encrypted, the data is secure during its transport across the internet through the "private tunnel". The AlterWAN™ network design minimize the number of hops each AlterWAN™ network packet experiences in its travel from source to destination thereby reducing latency by causing AlterWAN™ network traffic to be routed only over high bandwidth lines coupling participating ISX/ISP providers. Recently, there has been a large amount of building of ISX internet providers having fiber optic data paths to other providers to provide large amounts of bandwidth. Typically, one or both of the routers at the source and destination of the AlterWAN™ network can be co-located at the first ISX.

The privacy problem is overcome by firewalls provided in the AlterWAN™ network at every customer premises which are encrypting firewalls (preferred firewalls are commercially available from Netscreen). Every outgoing AlterWAN™ packet (AlterWAN packets are those packets which are encrypted and are transmitted along predefined routes through the internet in "private tunnels") is encrypted by the firewall at the source using a preconfigured encryption algorithm although any encryption algorithm such as conventional DES encryption that uses a key will suffice. The encryption process requires the preprogramming of "private tunnel" identities and the associated encryption and decryption keys. The "key" is used by the firewall/VPN device for encryption and decryption of the packet payload. Keys are preassigned for each "private tunnel" and are generated by the firewalls at each end from one or two passwords that are programmed into the firewall when the private tunnel is set up. Encrypted packets are routed over predefined paths. Packets intended for the general internet are not encrypted and are passed out to the first ISX to find their way through the internet by the normal routing process. Each packet that is intended for a predefined private tunnel is encrypted and sent out through a dedicated high bandwidth local loop to the first ISX. From there it is routed along a predefined route established by proper selection of ISX providers.

The key can remain the same over time or change, but no packet encrypted without the current key for a particular tunnel can be decrypted at the destination. The keys are never transmitted along the tunnels. They are configured into the firewalls by prearrangement at each end. Each tunnel has a different key.

A "private tunnel" is defined as the data path through the internet from the source firewall to the destination firewall through the predefined, low hop count, high bandwidth path. The private tunnel is established by proper selection if ISX providers. This is done by studying the normal routing paths used by all the ISX providers between a pair of customer sites to be connected by the tunnel. Then ISX providers which normally route along high bandwidth links with a minimum hop count are selected to participate. When AlterWAN packets reach these ISX providers, the normal routing that occurs there results in the AlterWAN encrypted packets travelling along a high bandwidth low hop count path.

The ability of firewalls to encrypt and decrypt is known and commercially available and is simply being used in the AlterWAN network. Browsers at workstations at customer AlterWAN sites however can be pointed to any website on the internet and can send and receive packets to and from those sites without restriction. Those packets are referred to herein as conventional packets, and they get to their destinations by conventional internet routing and do not pass through the private tunnels created by the AlterWAN data structures.

The AlterWAN data structures really are just IP addresses and associated data in the firewalls and routers along the tunnel that cause the packets to travel the low hop count path. The AlterWAN data structures will vary from customer to customer depending upon which sites are to be linked and the locations and IP addresses of the participating ISX/ISP providers through which the hops of the private tunnel will pass.

Finally, all species in the genus of the invention will solve the bandwidth bottleneck that has plagued prior attempts to use the internet as a WAN backbone. This is done by implementing AlterWAN™ routing strategies. An AlterWAN data path extends from a source router (having a channel service unit to interface between the packet world of routers to the physical and media access control and/or signalling protocols of the telephone line) through a sufficiently high bandwidth dedicated local loop line to the first participating ISX or Internet Service Provider (ISP) that is a participating provider of AlterWAN™ network services. From there it extends along a data path between other participating ISX providers along a data path which is guaranteed to have sufficient bandwidth to be able to handle the worst case bandwidth consumption of the customer. In the claims, such an ISX or ISP provider is referred to as a "participating ISX/ISP". All the ISX or ISP facilities that are participating in the AlterWAN™ network structure have fiber optic or other high bandwidth data paths such as OC3 or OC12 data paths available to them to send data to other ISX/ISP facilities that are participating in the AlterWAN™ network. It is these high bandwidth links which are referred to as "core bandwidth" between participating ISX/ISP facilities. It is this core bandwidth over which AlterWAN™ "private tunnel" traffic is routed on the internet backbone.

The dedicated lines from the source router at the customer premises to the nearest participating ISX/ISP is typically T1 class or better in bandwidth, but it only needs to have two characteristics: it must be dedicated and not dialup; and, it must have sufficient bandwidth capacity to handle the worst case bandwidth consumption of the particular client facility it serves. Such a line is referred to in the claims as a "dedicated line". Thus, the dedicated lines from the source router to the nearest participating ISX/ISP may also be DSL or fractional T1.

The "participating ISX/ISP" to which the "dedicated line" couples may not be the nearest ISX/ISP since it is a rule of the AlterWAN™ network to only choose ISX/ISP facilities that restrict the loads in their data paths so as to have large amounts of spare bandwidth capacity. For example, AboveNet typically has loads of 50% or less in their high bandwidth data paths to other ISX facilities. Therefore, AlterWAN™ network species will all have their dedicated connections to ISX/ISP facilities that have lots of spare bandwidth capacity and definitely more than the anticipated worse case bandwidth consumption of the customer so there is never a bandwidth bottleneck even if that ISX/ISP facility is not the closest facility. Although the local loop costs will be higher in such situations, the savings by using the internet as a backbone without quality of service problems will greatly outweigh the burden of higher local loop costs.

The use of the dedicated lines to the nearest participating ISX/ISP and selection of only ISX/ISP facilities that limit the traffic in their data paths so as to have a great deal of spare capacity are the two characteristics of all AlterWAN™ network species which solve the prior art bandwidth bottleneck problems.

The above described structure controls the three major unpredictability factors that have frustrated prior workers in the art who have attempted to use the internet to implement WANs: hop count, bandwidth availability, and latency. The advantages of the AlterWAN™ network structure and operation are: large savings in Telco charges; clean implementation of security not requiring PC or workstations to load special client software; use of ISX core internet bandwidth with sufficient bandwidth available for worst case scenarios and with a robust fault tolerant infrastructure; the ability to offer full or partial turn-key solutions to WAN needs; local loops may be a mix of different services and speeds from different providers; an apparent one hop route to each location; customer access to local router and firewall; both public and private IP addressing can be used; communications are secure through secure tunnels using encrypted packets; and not need to rely on quality of service software processes at either end to get data, voice and video through since the AlterWAN network controls hop count, latency and bandwidth availability inherently by its structure and operation.

DETAILED DESCRIPTION OF THE PREFERRED AND ALTERNATIVE EMBODIMENTS

Typically 60–80% of wide area network costs over a five year period are recurring telephone company charges for their frame relay and point-to-point networking services. These charges break down into: local loop charges to have the connection; a distance charge depending upon the distances between nodes; and, a bandwidth charge for the minimum bandwidth the customer specifies. These costs can typically be drastically reduced by using the internet as a WAN backbone, but only if the latency and other quality of service problems that have plagued prior art attempts can be solved. These costs can be drastically reduced over frame relay and point-to-point networks even if extra costs of crossing telephone company boundaries are not incurred. The AlterWAN™ network of the invention does not have any telephone company boundary problems to overcome.

Figure 1:
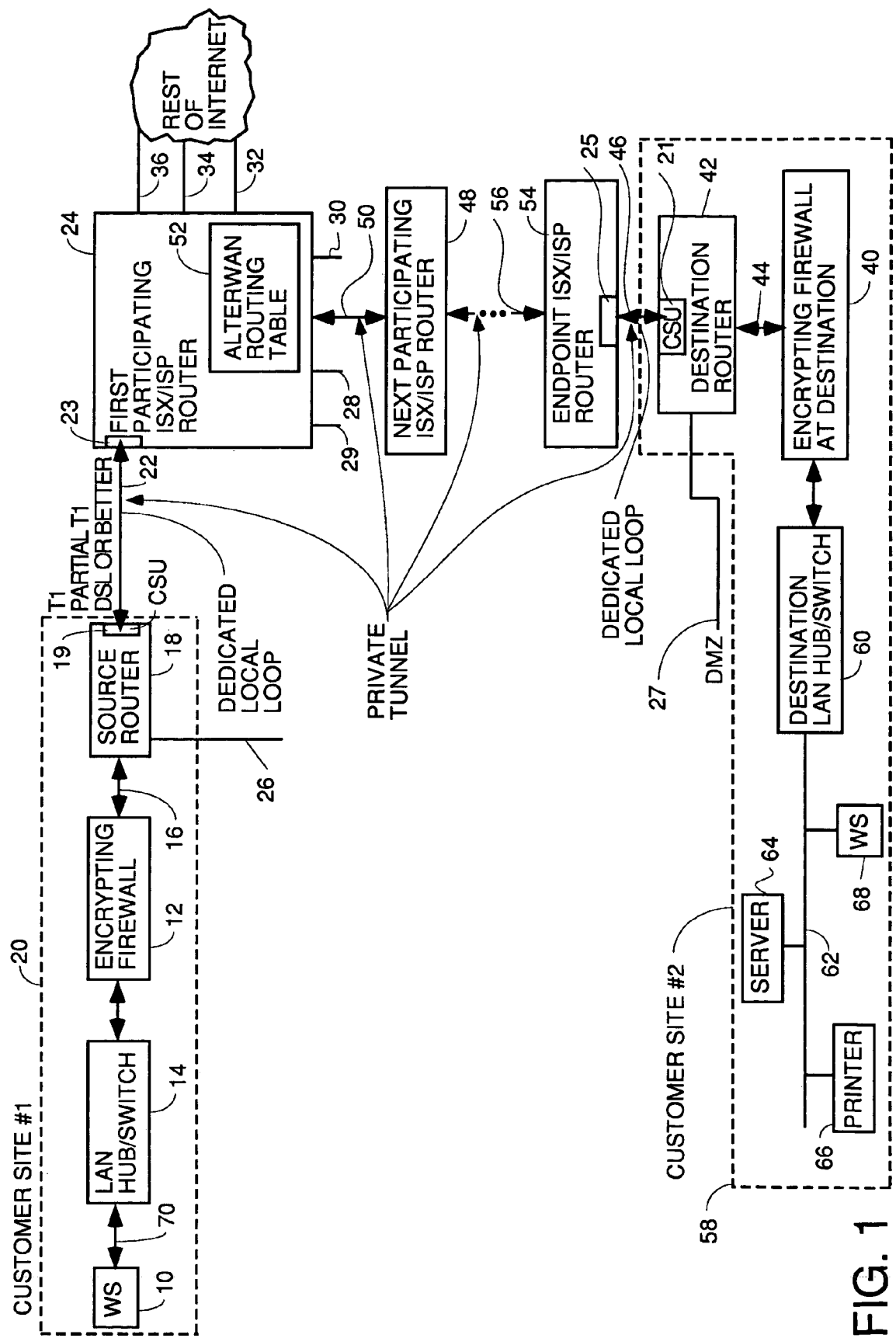
FIG. 1 is a block diagram of a WAN using the internet as a backbone according to the genus of the invention.

Referring to FIG. 1, there is shown a block diagram of a wide area network species within the genus of the wide area networks using the internet as the backbone with controlled, small hop count, reduced latency and adequate bandwidth for the worst case scenario. A work station 10 (or server or any other peripheral) is typically coupled to an encrypting/decrypting firewall 12 by a local area network represented in this case by a LAN hub or switch 14. The work station 10 or other device may also be coupled to the firewall 12 by a dedicated line in alternative embodiments, and there may be more than one workstation or other device coupled to the firewall 12 either by LAN 14 or by individual dedicated lines. The preferred firewall is manufactured by Netscreen, but any encrypting/decrypting firewall that uses a customer defined key to encrypt each AlterWAN™ packet that has an IP destination address at the end of an AlterWAN private tunnel will suffice.

The function of the firewall, in one embodiment, is to receive and encrypt downstream packets addressed to nodes at the destination site on the AlterWAN network and to receive conventional internet protocol packets (hereafter IP packets) addressed to some other IP address on the internet and distinguish them from AlterWAN packets and not encrypt them. Both AlterWAN and conventional IP packets are sent to the firewall from the workstation 10 or other peripherals at customer site 1, shown in dashed lines at 20. One function of the firewall 12 (and the corresponding firewall 40 at the destination) is to distinguish between AlterWAN packets and conventional IP packets. AlterWAN packets are those packets which are addressed to destinations at the end of an AlterWAN private tunnel. Conventional packets are IP packets addressed to any other IP address other than an address at the other end of an AlterWAN private tunnel. The firewall at each end of a private tunnel are configured to encrypt AlterWAN packet payloads and send them to a router at the location of firewall from which they are converted to a suitable signal format for transmission on a dedicated local loop connection and transmitted to the first ISX/ISP provider along predefined high bandwidth, low hop-count private tunnel through the internet. Conventional IP packets are not encrypted and are sent to the router and on the same dedicated local loop connection to the first participating ISX/ISP where they are routed to their destinations without using the private tunnel high bandwidth, low hop-count route. The firewalls make this distinction by examining the packet headers and using the destination address information and one or more lookup tables to determine which packets are AlterWAN packets addressed to nodes on the AlterWAN network and which packets are addressed to any other IP address outside the AlterWAN network.

More specifically, at each end of a private tunnel, a packet addressed to any of the IP addresses of devices at the other end of a private tunnel are recognized as packets that need to be converted to AlterWAN packets, encrypted by the firewall and encapsulated in another IP packet having as its destination address the IP address of the untrusted side of the firewall at the other end of the private tunnel. The composite AlterWAN packet is comprised of the encrypted original IP packet with an AlterWAN packet header which has as its destination address the IP address of the untrusted side of the destination firewall. At the firewall at the other end, these incoming AlterWAN packets will recognized because their destination addresses match the IP address of the untrusted side of the firewall. The firewall then strips off the AlterWAN packet header of the encapsulating packet and decrypts the original IP packet that was encapsulated using the same encryption algorithm and key or keys that were used to encrypt it. The decrypted packet then has an IP packet header which has a destination address which matches the IP address of some device on the LAN on the trusted side of the destination firewall. The decrypted packet is then put on the destination LAN and makes its way to the device to which it was addressed.

The main function of the firewall is to encrypt the payloads of only AlterWAN packets with customer defined key or keys which are configured to be the same in the firewalls at both ends of the tunnel. In the preferred embodiment, commercially available firewalls are used which are configured to use the same encryption algorithm and encryption keys at both ends of each tunnel for packets travelling in either direction along the tunnel. However, in alternative embodiments, firewalls may be used which use one encryption algorithm and set of one or more encryption keys for packets travelling in one direction along the tunnel and another different encryption algorithm and/or a different set of keys in the firewalls at each end of the tunnel for packets travelling in the opposite direction. The corresponding firewall/VPN device at the tunnel far end must be programmed with the exact same key used to encrypt the packet to decrypt the packet. The encrypted packet is tested with the local key to decrypt the packet. If a match exists, the packet is decrypted and allowed through the firewall/VPN device. If not, it is discarded. Many firewalls set the encryption method and key the same for both directions of a private tunnel. In the event a firewall/VPN device implements a private tunnel by using a different encryption method and or key for each half of a private tunnel, and that both firewall/VPN devices are configured properly, they may be implemented and used in an AlterWAN network solution. The key can be the same for all AlterWAN packets over time or it can change over time. Any encryption algorithm capable of doing this will suffice. Any conventional IP packets are not encrypted by the firewall and are simply forwarded to a router such as source router 18 or destination router 42.

The firewalls 12 and 40 are typically coupled by another local area network line to a router at the source or destination site. For example, firewall 12 is coupled by LAN line 16 to a router 18 at customer site 1, and firewall 40 is coupled by a LAN line 44 to destination router 42. Routers 18 and 42 each function to route AlterWAN and conventional IP packets differently. Both routers 18 and 42 route any AlterWAN packet into a "private tunnel" of a dedicated high bandwidth local loop data path 22 which guides these AlterWAN packets to the first participating ISX/ISP 24 in the AlterWAN™ network. The first and last participating ISX/ISP providers also have channel service units represented by boxes 23 and 25. Any conventional-IP-packets are also routed into dedicated data path 22, but these conventional data packets are not part of the AlterWAN private tunnel because their destination addresses are not the address of the destination at the other end of the tunnel. Each of routers 18 and 42 includes a channel service unit, as shown at 19 and 21. These channel service units convert the digital data of the packets into signals suitable for transmission on whatever type of dedicated local loop signal path 22 and 46 are selected. The local loop dedicated signal paths 22 and 46 do not need to be the same type of signal path at both ends so long as suitable channel service units or cable modems are selected for CSUs 19 and 21.

The dedicated line 22 is typically a T1 class, partial T1 or DSL line or better with adequate bandwidth in both directions to meet the worst case bandwidth consumption scenario. DSL lines are typically not preferred since they typically only have about 640 Kbps bandwidth upstream to the CO even though they have 1.544 Mbps downstream or better. There are however some ADSL variations with up to 5 Mbps upstream and 51.84 Mbps downstream from the CO to the customer sites. One variant of ADSL supports 15 Mbps upstream and 155 Mbps downstream, but the customer ADSL modem must be within 500 meters of the central office so such a line is highly impractical unless the AlterWAN customer site is virtually at the CO. Since the AlterWAN™ network is bidirectional and must have sufficient bandwidth on all data path segments thereof to meet the worst case scenario, DSL lines typically cannot be used unless the worst case scenario does not exceed the DSL line upstream bandwidth specification. Also, for DSL lines, the CO must be within about 2 miles (0.6 to 1.2 miles for the higher speed variants) from the customer site and this restriction can rule out their use if a deal with a participating ISX/ISP within that range cannot be made.

Each of routers 18 and 42 have a channel service unit (not separately shown) built into the router (or external). The function of these channel service units in the local loop is to electrically and physically convert the (LAN) ethernet data to the signalling protocols and signal format of the telco on whatever dedicated lines 22 and 46 are chosen. The dedicated lines can be different (telephone lines or hybrid fiber coax of a CATV system or digital cable or satellite bidirectional links) and can be provided by different vendors. For example, if the dedicated line 22 is a T1 line the channel service units converts the AlterWAN packet data into signaling compatible with the chosen telco and transmission of that data to the matching CSU/router at the other end of the local loop where the signal is converted back to a format acceptable for processing be the router at the ISX. If the dedicated line is the hybrid fiber coaxial digital cable of a CATV system using frequency division multiplexing or code division multiplexing or discrete multitone modulation, the channel service unit modulates the ethernet onto the proper FDMA carriers or spreads the spectrums for transmission across the "local loop" with the spreading codes dedicated to the AlterWAN connection. This interfacing is bidirectional between the signal formats and protocols on dedicated lines 22 and 46.

Routers 18 and 42 are the translators of the AlterWAN™ network private tunnel. The routers translate from ethernet protocol to the telco protocol on the dedicated lines 22 and 46. Other conventional IP packets that reach router 18 are routed along the same physical path and the dedicated lines but really are on a different logical path. Their payloads are not encrypted and they are not sent through the "private tunnels". AlterWAN packets addressed to different destinations will be routed into the proper private tunnels of the AlterWAN network set up for those destinations. In some embodiments, conventional IP packets will be blocked by router 18 from entering the private tunnel or any other logical channel of the dedicated lines 22 and 46. Data path 26 leaving router 18 is a DMZ path and is optional. Likewise, destination router 42 includes a DMZ port 27. The DMZ path can be any other data path that is not part of the AlterWAN network, and is typically where mail servers reside.

One of the side effects of having the high speed dedicated line 22 is that workstations at the client facility 1 (and the client facility at the other end of the WAN) can also have high speed internet access to other websites that have nothing to do with the AlterWAN solution without a separate connection. The AlterWAN traffic on dedicated line 22 shares this transport with non-AlterWAN traffic so it is important that the bandwidth on this dedicated local loop meet the aggregate needs of both AlterWAN traffic and conventional traffic. As part of this process, packets that are not AlterWAN packets are recognized by the firewall by looking at the addressing information in packet header information and are not encrypted. Conversely, packets that appear to the firewall to be addressed to nodes in the AlterWAN network have their packet payloads encrypted. All the packets are then sent to the source router 18 (or destination router 42) which routes them. Conventional packets get routed on dedicated line 22 other than the AlterWAN private tunnel to the first participating ISX/ISP 24. At the first ISX/ISP 24 in the AlterWAN network, these conventional packets get routed out one of the data paths represented by lines 27 through 36 that couple router 24 to the rest of the internet. This provides high speed access to other web pages and websites and e-mail services as a byproduct of the AlterWAN hardware and software processing.

AlterWAN packets get routed at the first ISX/ISP 24 into a high bandwidth data path 50 to the next participating ISX/ISP 48 in the AlterWAN network. Data path 50 is selected for the AlterWAN packets by the preselected ISX/ISP and peer level predefined routing between participating ISX/ISP's. This allows AlterWAN traffic to be transported between locations utilizing the naturally existing routes but those routes are selected so as to be high bandwidth and low hop count. Each router in the participating ISX/ISP facilities connects and communicates in the same fashion. AlterWAN networks, by design, require selection of the ISX/ISP partners for any given network based on many factors including the ease of implementation by utilizing naturally occurring or other existing high bandwidth, low hop count routes. AlterWAN designers pretest these routes by performing a minimum of a ping test and traceroute test to verify the path data that AlterWAN packets will take through the private tunnel that is to be implemented as an AlterWAN connection. AlterWAN partners do not normally need to add special routes, but implementing AlterWAN network designs that follow existing known paths does not preclude the addition of special routing from time to time as needed to afford better routing. By such a process, an AlterWAN network does not require each participating ISX/ISP to make alterations to their equipment for each "private tunnel" created but rather transparently utilizes the high bandwidth peer level connections between ISX/ISP's. However, the invention does not preclude use of ISX/ISP providers who have altered their routing tables so as to insure that AlterWAN packets get routed along high bandwidth, low hop-count data paths while non-AlterWAN packets get routed along other data paths. Participating ISX/ISP's are selected in part based on their ability to use these natural routes to form low hop count connections between the ends of an AlterWAN private tunnel or by entering into a special deal with one or more other participating ISX/ISP's to implement special peering arrangements and/or routing between each other to allow only AlterWAN traffic to use these special low hop count high bandwidth connections forcing non AlterWAN traffic to follow other natural routing that does not provide the bandwidth and or hop counts that meet the AlterWAN requirement.

In the example of FIG. 1, only three participating ISX/ISP providers are shown at 24, 48 and 54. The high bandwidth paths are the naturally occurring data paths that result from the routing tables in the participating ISX provider routers. These data paths are represented by lines 50 and 56. The private tunnel between customer site #1 at 20 and customer site #2 at 58 is implemented by the dedicated lines 22 and 46 and the high bandwidth data paths 50 and 56 selected for AlterWAN packets by the routing tables in participating ISX/ISP providers 24, 48 and 54.

When AlterWAN packets from customer site #1 reach endpoint ISX/ISP router 54, they are routed onto dedicated line 46 to the channel service unit of destination router 42. The destination router 42 recovers and reassembles the ethernet packets and outputs them to firewall 40. Firewall 40 decrypts all AlterWAN packets with its local matching key preconfigured on the firewall/VPN device and formats them to the LAN protocol. It then forwards them to the destination LAN hub or switch 60 where they are sent out on LAN 62 addressed to whatever peripheral 64, 66 or 68 to which they are destined. AlterWAN packets from any of these peripherals addressed to any of the peripherals at customer site #1, 20, are encrypted by firewall 40 and are routed back through the private tunnel to site 20 where they are decrypted by firewall 12 and forwarded to LAN hub or switch 14 and sent out on LAN 70 to whatever peripheral at site 20 to which they are addressed.

Firewall And Tunnel Setup

The firewalls 12 and 40 can be any commercially available firewall with the ability to create a virtual private network. The firewalls serve two general purposes: they provide general security from unwanted access to the AlterWAN customer LAN network; and they provide private encrypted tunnels between a known set of sites even though the internet is a public facility. Each customer's AlterWAN network will be different based upon their needs in terms of the type and bandwidth of dedicated lines used and the private tunnel data paths set up through the participating ISX/ISP providers between customer sites.

The interfaces of a firewall consist of an untrusted WAN interface, one or more trusted IP interfaces to dedicated lines or LAN drop lines, and a DMZ interface (if available). These three interfaces are illustrated at 72, 74 and 76, respectively, in FIG. 2 which is a block diagram of the actual hardware configuration of a typical AlterWAN network. The untrusted or WAN interface is used to interface to the ISX/ISP premises router of the public internet, optionally through a customer premises router 18 or 42. The IP trusted interface interfaces to the customer's private local area network 70 or 62 (or to dedicated lines to each peripheral in some embodiments). The DMZ interface (optionally available on some firewalls) is used to configure a separate network where devices that may need both public and private access typically are placed including WEB servers and e-mail servers.

Figure 2:
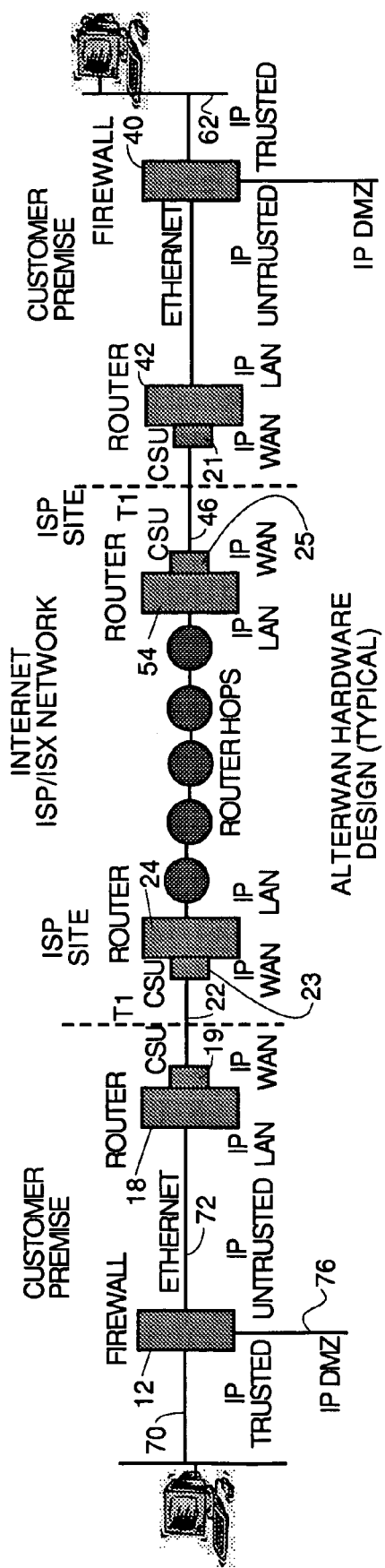
FIG. 2 is a block diagram of the actual hardware used in a typical AlterWAN network.

Every LAN and WAN interface at both the customer premises and the ISX/ISP in FIG. 2 needs to be configured with IP addresses. The exception to this would be any LAN using a protocol different than ethernet IP such as Token Ring. In such case the proper networking and conversion equipment would be required. Each interface to be configured in general includes: an IP address, for example 204.123.111.150; a network mask, for example 255.255.255.0; and a default gateway, for example 204.123.111.1. The addressing for each interface is either supplied by the ISX/ISP or by the customer. The telephone (or cable system operator) high bandwidth dedicated lines 22 and 46 need to be in place and operational in addition to the configurations mentioned above to complete the AlterWAN structure.

Tunnels and encryption methods vary between manufacturers of firewalls and virtual private network (hereafter VPN) equipment. This limits the ability to mix products from different manufacturers within a specific customer's AlterWAN setup because the firewall/VPN process at each end of each tunnel must use the same encryption algorithms so AlterWAN packets can be properly encrypted and decrypted. If however, all firewalls from all manufacturers can be modified to use the same encryption algorithm, then firewall/VPN processes from different manufacturers can be mixed and matched. The VPN processing hardware and software to encrypt and decrypt AlterWAN packets can be integrated into the firewall or external to it.

Figure 3:
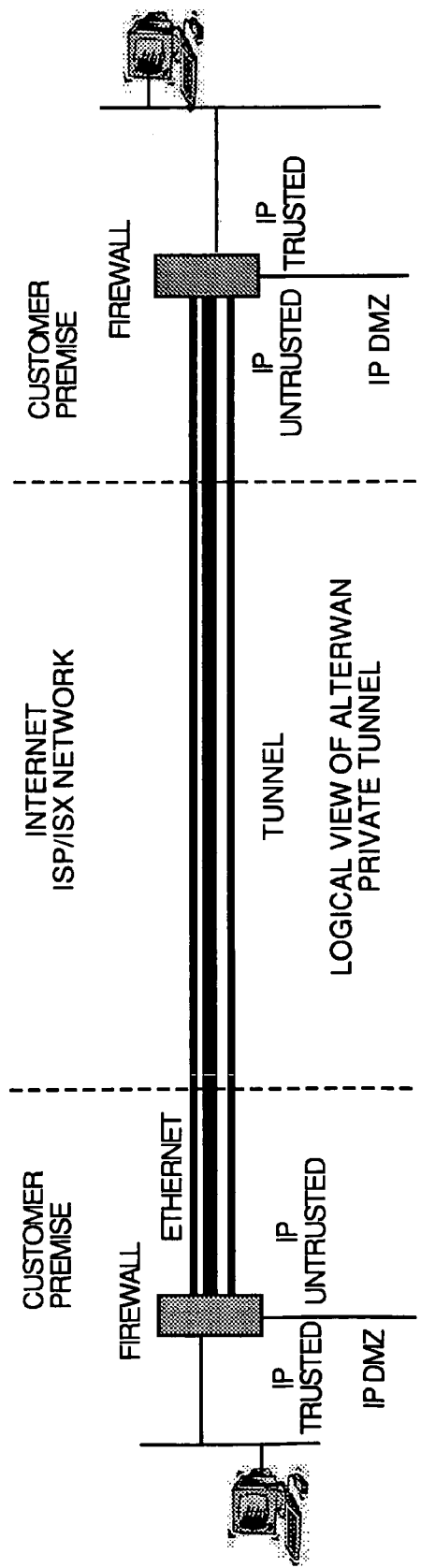
FIG. 3 is a logical view of an AlterWAN private tunnel.

A virtual private network tunnel requires the following basic components and data structures at each end of the tunnel. There must be a virtual private network process running on a VPN processor (can be the same processor as the firewall processor) or external to a firewall on each end of the private tunnel. The untrusted address of the far end VPN untrusted WAN interface must be configured in the VPN configuration data structure at each end including a mnemonic label, an IP address and a network mask. The VPN configuration data structure at each end must also include a mnemonic label, an encryption key, an encryption type, an encryption password, and the gateway IP address of the far end firewall untrusted or WAN interface. Only when a VPN pair configured in this manner exists with one VPN on each end of a proposed tunnel, and the participating ISX/ISP providers route a path between the two endpoints over high bandwidth links with a minimum number of hop for AlterWAN packets, does the private tunnel actually exist. Once the tunnel is created, all the conventional internet routers and uncontrolled number of hops and uncontrolled latency that they create for non AlterWAN packets virtually disappear for AlterWAN packets. The AlterWAN data path logically appears to be a direct point-to-point connection between the two sites at opposite ends of the tunnel as shown in FIG. 3.

Private tunnels are defined for each customer based upon the needs of that customer. This is done by identifying a set of known participating ISX/ISP locations through which the number of known hops caused by their routers is minimized. All locations on the internet outside this known set of sites and the associated networks are assumed to be general internet sites to which conventional IP packets can be directed.

The only real difference between a conventional IP packet and an AlterWAN packet is that the payload of the Alter-WAN packet is encrypted Conventional packets have no encryption performed on the packet payload and are routed to the default gateway IP address of the participating ISP/ISX.

The firewalls at each end of each private tunnel prevent any unauthorized user from accessing the private LANs of AlterWAN customers. The tunnels in each firewall have configuration data that only allows specific user traffic access to the private tunnels. Traceroutes to any address outside the tunnel show all router hops for conventional packets while traceroutes to any address inside a private tunnel shown only private tunnel hops for AlterWAN traffic. The establishment of a private tunnel enables users at a first customer site to appear to be directly connected to a LAN at another site of the customer so that all the shared resources on the other end of the tunnel appear on the desktops of the workstations at the first site. Most of the participating providers in AlterWAN structures are ISX providers. This eliminates the numerous hops customers typically incur in dealing with local ISPs for wide area networking. By picking participating ISX providers that have high bandwidth lines that are not fully utilized, the bandwidth availability problem of using the internet as a WAN backbone is solved. Numerous ISX providers now offer 1-hop connections to major cities in the U.S. and throughout the world. The AlterWAN network structure takes advantage of this fact by selecting the ISX/ISP's that form the shortest path(s) between the set of customer sites that need to communicate. Through this design and selection process, the natural routes that stitch together these high bandwidth single hop lines with dedicated high bandwidth local loops to geographically separated customer sites to create a private tunnel through the internet between any two customer sites to provide frame relay quality service at substantially less cost.

Frame relay prior art WANs were considered highly desirable because they establish permanent virtual circuits with known paths having known bandwidth. The internet has not been able to provide a similar solution in the prior art. The AlterWAN network structure changes that by creating virtual private circuits or tunnels through the internet using only lines that are known to have sufficient bandwidth to carry the worst case load and by minimizing the number of hops by using primarily ISX providers. Prior attempts to use the internet for WANs have failed because the data paths were not controlled, the bandwidth was oversubscribed or in any fashion insufficient causing unacceptable latency and delays. This caused unpredictable latency which is very undesirable for multimedia video and audio traffic. Only light users with small amounts of non time sensitive data were able to use the internet successfully as a WAN. The AlterWAN network structure uses a set of known high bandwidth, usually fiber optic, links between major domestic and international cities and couples these data paths with dedicated point-to-point or frame relay circuits run locally from the "nearest" participating ISX/ISP (sometimes it is not the physically nearest ISX but is the nearest ISX with a high bandwidth line to a key city that is participating) to the customer site. The unique aspects are forcing the participating routers to stitch together known high bandwidth data paths with a minimum number of hops to high bandwidth dedicated local loop connections and encrypting all Alter-WAN traffic for privacy.

Figure 4:
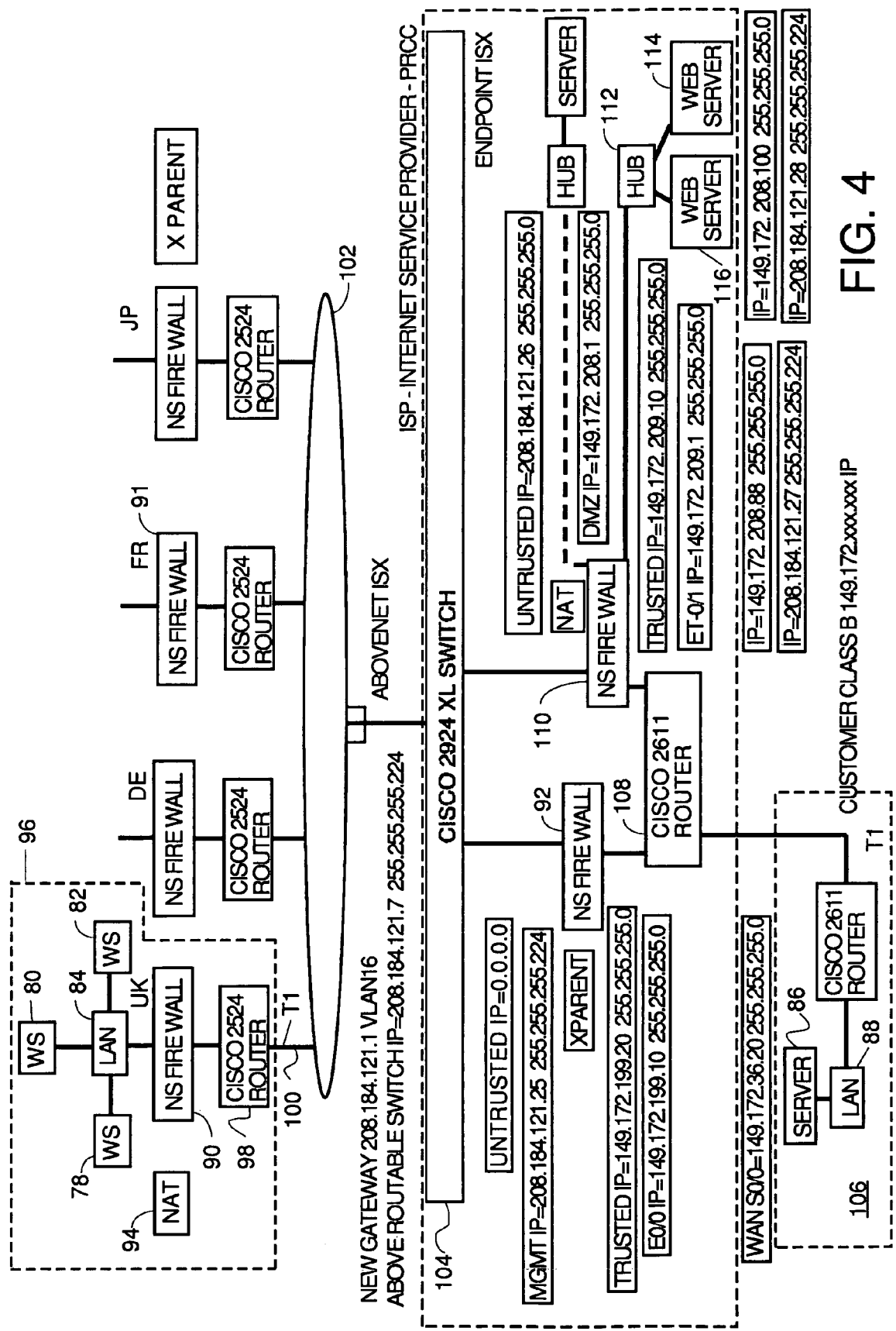
FIG. 4 is a block diagram of a typical AlterWAN network for a U.S. headquarters coupled to several international sites.

FIG. 4 is block diagram of a typical AlterWAN network for an international corporation with multiple international locations in the U.K., Germany, France and Japan with a headquarters in the U.S. Suppose one of workstations 78 through 82 on LAN 84 in the U.K. site 96 wants to have access to server 86 on LAN 88 at the U.S. headquarters. Workstations 78 generates an IP packet that gets encapsulated into an Ethernet or other LAN packet addressed to the firewall 90. The firewall looks up the IP address in its tables and determines that the packet is addressed to an AlterWAN IP address in the U.S. headquarters. It then encrypts the payload portion of the packet using the prearranged key for the tunnel to the destination. The encrypted packet payload is sent through the "private tunnel" from the U.K. firewall 90 to the U.S. site firewall 92. Network address translation unit converts any IP addresses that conflict with private IP addresses owned by some other company to one IP address on the untrusted interface given by the participating ISX. Firewalls can handle both NAT addressing and transparent addressing, but that is not relevant to the invention.

After encryption, the AlterWAN packet is forwarded to router 98 at the U.K. site 96. This router examines every packet and based on the routing tables forwards packets to the next ISX. In this case, the router will only receive packets from the firewall if they were not for the local LAN. At this time, AlterWAN packets and conventional IP packets are equal, but AlterWAN traffic has "designed in" efficient routing paths to the destination points with the ISX/ISP connected by dedicated local loop line 100 that couples the router to the first participating ISX provider within internet cloud 102 via a known internal or external channel service unit. The router in the first participating ISX within the internet cloud receives the AlterWAN packets and routes them along the predetermined private tunnel data path that has been preplanned to use the natural routing table (unless a special case requires additional special routes). This process continues at each router of each ISX along the private tunnel to the U.S. site 106. The last participating ISX along the private tunnel is represented by switch 104. This switch has all AlterWAN packets destined for this location passing therethrough and may be used to keep track of traffic levels for purposes of billing. Billing can be based on fixed monthly connections and/or billing with a base fee and usage fee. Collection of the information to generate billing on base fee plus usage is from each location requiring such.

From switch 104, AlterWAN packets are routed to firewall 92 at the customer U.S. site where they are decrypted and sent to router 108 which outputs the packets onto LAN 88 where they are received and processed by server 86. Non AlterWAN packets routed by switch 104 to firewall 110 are either replies to general internet activity initiated on LAN 88 or outside traffic requests intended for the web servers 114 and 116 on the firewall DMZ. Any other traffic would be rejected by the firewall. These packets are not encrypted, and after the firewall 110 processes them, they are routed to a LAN hub 112 and sent from there to a web server 114 and another web server 116.

AlterWAN packets that originate at the U.K. or one of the other international sites and are addressed to another international site never go to switch 104. Instead an IP packet originating at, for example, the U.S. site and addressed to a device on the LAN at the French site, get routed through a private tunnel that extends from the U.K. firewall 90 to the French firewall 91. Thus, these packets never pass through switch 104.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

Appendix A is a typical list of configuration commands for the firewall at the headquarters site of a typical AlterWAN to establish a private tunnel through the internet from the headquarters to a destination site firewall including establishment of the IP address of the first ISX in the tunnel. Appendix B is a typical list of configuration commands for the destination site firewall at the other end of the private tunnel. Appendix C is a typical list of configuration commands to configure the router at the headquarters site. Appendix D is a typical list of configuration commands to configure the router at the destination site.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

```
NS100-HQ-NAT-> get conf
Total Config size 6229:
set url server 0.0.0.0 15868 10
set url message "NetScreen and NetPartners WebSENSE have been set to block this site."
set url msg-type 1
set url config disable
set auth type 0
set auth timeout 20
set admin name admin
set admin password admin
set admin sys-ip 0.0.0.0
set interface trust bandwidth 10000
set interface untrust bandwidth 10000
set interface dmz bandwidth 10000
set interface trust ip 149.172.209.10 255.255.255.0
set interface untrust ip 208.184.121.26 255.255.255.224
set interface dmz ip 149.172.208.1 255.255.255.0
set interface trust phy half 10mb
set interface untrust phy half 10mb
set interface trust ping
set interface untrust ping
set interface dmz ping
set interface trust mng
set interface untrust mng
set interface trust gateway 149.172.209.1
set interface untrust gateway 208.184.121.1
set flow tcp-mss
set hostname NS100-HQ-NAT
set address untrust "UK" 149.172.240.0 255.255.255.0
set address trust "PONG" 149.172.204.111 255.255.255.255 "pong.ikos.com"
set address dmz "Starfish" 149.172.208.88 255.255.255.255 "Rich Haney's Web Server"
set address dmz "s1" 149.172.208.100 255.255.255.255 "IKOS Public Web Server"
set address dmz "DMZ Subnet" 149.172.208.0 255.255.255.0
set service "RSH" protocol tcp src-port 0-1023 dst-port 514-514 group "remote"
set syn-alarm 1024
set syn-qsize 10240
set syn-timeout 20
set syn-threshold 200
set firewall tear-drop
set firewall syn-attack
unset firewall ip-spoofing
set firewall ping-of-death
set firewall src-route
set firewall land
set firewall icmp-flood
set firewall udp-flood
set firewall winnuke
set firewall port-scan
set firewall adr-sweep
set firewall default-deny
set syslog config 149.172.200.202 auth/sec auth/sec warn
set syslog enable
set vpn "HQ-UK" manual 4444 5555 gateway 195.14.71.226 esp 3des password letmein auth md5 password letmein
set mip 208.184.121.27 host 149.172.208.88 netmask 255.255.255.255
set mip 208.184.121.28 host 149.172.208.100 netmask 255.255.255.255
set policy todmz "Inside Any" "DMZ Any" "ANY" Permit log count
set policy fromdmz "DMZ Any" "Inside Any" "ANY" Permit log count
set policy fromdmz "DMZ Any" "MIP(208.184.121.27)" "ANY" Permit log
set policy incoming "Outside Any" "MIP(208.184.121.27)" "ANY" Permit log count
set policy incoming "Outside Any" "MIP(208.184.121.28)" "ANY" Permit log count
set policy outgoing "Inside Any" "UK" "ANY" Encrypt vpn-tunnel "HQ-UK"
set policy todmz "Outside Any" "DMZ Any" "DNS" Permit log count
```

FIREWALL HQ SETUP
APPENDIX A

```
NS100-HQ-NAT-> get conf
Total Config size 6229:
set url server 0.0.0.0 15868 10
set url message "NetScreen and NetPartners WebSENSE have been set to block this site."
set url msg-type 1
set url config disable
set auth type 0
set auth timeout 20
set admin name admin
set admin password admin
set admin sys-ip 0.0.0.0
set interface trust bandwidth 10000
set interface untrust bandwidth 10000
set interface dmz bandwidth 10000
set interface trust ip 149.172.209.10 255.255.255.0
set interface untrust ip 208.184.121.26 255.255.255.224
set interface dmz ip 149.172.208.1 255.255.255.0
set interface trust phy half 10mb
set interface untrust phy half 10mb
set interface trust ping
set interface untrust ping
set interface dmz ping
set interface trust mng
set interface untrust mng
set interface trust gateway 149.172.209.1
set interface untrust gateway 208.184.121.1
set flow tcp-mss
set hostname NS100-HQ-NAT
set address untrust "UK" 149.172.240.0 255.255.255.0
set address trust "PONG" 149.172.204.111 255.255.255.255 "pong.ikos.com"
set address dmz "Starfish" 149.172.208.88 255.255.255.255 "Rich Haney's Web Server"
set address dmz "s1" 149.172.208.100 255.255.255.255 "IKOS Public Web Server"
set address dmz "DMZ Subnet" 149.172.208.0 255.255.255.0
set service "RSH" protocol tcp src-port 0-1023 dst-port 514-514 group "remote"
set syn-alarm 1024
set syn-qsize 10240
set syn-timeout 20
set syn-threshold 200
set firewall tear-drop
set firewall syn-attack
unset firewall ip-spoofing
set firewall ping-of-death
set firewall src-route
set firewall land
set firewall icmp-flood
set firewall udp-flood
set firewall winnuke
set firewall port-scan
set firewall adr-sweep
set firewall default-deny
set syslog config 149.172.200.202 auth/sec auth/sec warn
set syslog enable
set vpn "HQ-UK" manual 4444 5555 gateway 195.14.71.226 esp 3des password letmein auth md5 password letmein
set mip 208.184.121.27 host 149.172.208.88 netmask 255.255.255.255
set mip 208.184.121.28 host 149.172.208.100 netmask 255.255.255.255
set policy todmz "Inside Any" "DMZ Any" "ANY" Permit log count
set policy fromdmz "DMZ Any" "Inside Any" "ANY" Permit log count
set policy fromdmz "DMZ Any" "MIP(208.184.121.27)" "ANY" Permit log
set policy incoming "Outside Any" "MIP(208.184.121.27)" "ANY" Permit log count
set policy incoming "Outside Any" "MIP(208.184.121.28)" "ANY" Permit log count
set policy outgoing "Inside Any" "UK" "ANY" Encrypt vpn-tunnel "HQ-UK"
set policy todmz "Outside Any" "DMZ Any" "DNS" Permit log count
```

FIREWALL HQ SETUP
APPENDIX A

```
set policy todmz "Outside Any" "DMZ Any" "FTP" Permit log count
set policy todmz "Outside Any" "DMZ Any" "HTTP" Permit log count
set policy todmz "Outside Any" "DMZ Any" "HTTPS" Permit log count
set policy todmz "Outside Any" "DMZ Any" "POP3" Permit log count
set policy todmz "Outside Any" "DMZ Any" "MAIL" Permit log count
set policy todmz "Outside Any" "DMZ Any" "PING" Permit log count
set policy outgoing "Inside Any" "MIP(208.184.121.27)" "ANY" Permit log
set policy outgoing "Inside Any" "MIP(208.184.121.28)" "ANY" Permit log
set policy outgoing "Inside Any" "Outside Any" "ANY" Permit log
set policy fromdmz "DMZ Any" "MIP(208.184.121.28)" "ANY" Permit log
set policy fromdmz "DMZ Any" "Outside Any" "ANY" Permit log count
set route 149.172.45.0 255.255.255.0 interface trust gateway 149.172.209.1 metric 1
set route 149.172.204.0 255.255.255.0 interface trust gateway 149.172.209.1 metric 1
set route 149.172.200.0 255.255.255.0 interface trust gateway 149.172.209.1 metric 1
set route 149.172.202.0 255.255.255.0 interface trust gateway 149.172.209.1 metric 1
set route 149.172.206.0 255.255.255.0 interface trust gateway 149.172.209.1 metric 1
set route 149.172.201.0 255.255.255.0 interface trust gateway 149.172.209.1 metric 1
set route 149.172.215.0 255.255.255.0 interface trust gateway 149.172.209.1 metric 1
set route 149.172.155.0 255.255.255.0 interface trust gateway 149.172.209.1 metric 1
set route 149.172.145.0 255.255.255.0 interface trust gateway 149.172.209.1 metric 1
set route 149.172.205.0 255.255.255.0 interface trust gateway 149.172.209.1 metric 1
set route 149.172.170.0 255.255.255.0 interface trust gateway 149.172.209.1 metric 1
NS100-HQ-NAT->
```

```
IKOS-UK-> get conf
Total Config size 1390:
set url server 0.0.0.0 15868 10
set url message "NetScreen and NetPartners WebSENSE have been set to block this site."
set url msg-type 1
set url config disable
set auth type 0
set auth timeout 20
set clock ntp
set admin format dos
set admin name admin
set admin password admin
set admin sys-ip 0.0.0.0
set admin mail alert
set admin mail server-ip 149.172.200.202
set admin mail mail-addr1 mark@ikos.com
set admin mail mail-addr2 jj@ikos.com
set admin mail traffic-log
set interface trust ip 149.172.240.1 255.255.255.0
set interface untrust ip 195.14.71.226 255.255.255.248
set interface dmz ip 195.14.71.233 255.255.255.248
set interface trust ping
set interface untrust ping
set interface dmz ping
set interface trust mng
set interface untrust mng
set interface untrust gateway 195.14.71.225
set hostname IKOS-UK
set ntp server 149.172.204.111
set ntp zone 5
set address untrust "HQ-UK" 149.172.209.10 255.255.255.0
set syn-threshold 200
set firewall tear-drop
set firewall syn-attack
unset firewall ip-spoofing
set firewall ping-of-death
set firewall src-route
set firewall land
set firewall icmp-flood
set firewall udp-flood
set firewall winnuke
set firewall port-scan
set firewall adr-sweep
set firewall default-deny
set vpn "HQ-UK" manual 5555 4444 gateway 208.184.121.26 esp 3des password letmein auth md5 password letmein
set policy outgoing "Inside Any" "HQ-UK" "ANY" Encrypt vpn-tunnel "HQ-UK"
set policy outgoing "Inside Any" "Outside Any" "ANY" Permit
set syslog config 149.172.200.202 auth/sec auth/sec warn
set syslog enable
IKOS-UK->
```

DESTINATION FIREWALL SETUP
APPENDIX B

```
PRCC-IKOS-T1#sh conf
Using 2095 out of 29688 bytes
!
version 11.3
service timestamps debug uptime
service timestamps log uptime
service password-encryption
!
hostname PRCC-IKOS-T1
!
boot system flash 1:c2600-d-mz.113-6.T.bin
enable password 7 08324D401D18
!
ip subnet-zero
ip domain-list ikos.com
ip domain-list pacificresources.com
ip domain-name ikos.com
ip name-server 149.172.208.100
!
!
!
interface Ethernet0/0
 ip address 208.184.121.25 255.255.255.224
 ip broadcast-address 208.184.121.31
 ip mask-reply
 no ip directed-broadcast
 no ip mroute-cache
!
interface Serial0/0
 ip address 149.172.36.20 255.255.255.0
 ip broadcast-address 149.172.36.255
 ip mask-reply
 no ip directed-broadcast
 no ip mroute-cache
 no fair-queue
!
interface Ethernet0/1
 ip address 149.172.209.1 255.255.255.0
 ip broadcast-address 149.172.209.255
 ip mask-reply
 no ip directed-broadcast
 no ip mroute-cache
!
ip default-gateway 208.184.121.1
no ip classless
ip route 0.0.0.0 0.0.0.0 Ethernet0/0 208.184.121.1
ip route 149.172.0.0 255.255.0.0 Serial0/0 149.172.36.1 2
ip route 149.172.36.0 255.255.255.0 Serial0/0
ip route 149.172.145.0 255.255.255.0 Ethernet0/1 149.172.209.10 2
ip route 149.172.195.0 255.255.255.0 Ethernet0/1 149.172.209.10 2
ip route 149.172.204.0 255.255.255.0 Serial0/0 149.172.36.1
```

*HQ Router Setup*
*Appendix C*

```
ip route 149.172.208.0 255.255.25●.● Ethernet0/1 149.172.209.10
ip route 149.172.209.0 255.255.255.0 Ethernet0/1
ip route 149.172.210.0 255.255.255.0 Ethernet0/1 149.172.209.10 2
ip route 149.172.212.0 255.255.255.0 Ethernet0/1 149.172.209.10 2
ip route 149.172.220.0 255.255.255.0 Ethernet0/1 149.172.209.10 2
ip route 149.172.225.0 255.255.255.0 Ethernet0/1 149.172.209.10 2
ip route 149.172.235.0 255.255.255.0 Ethernet0/1 149.172.209.10 2
ip route 149.172.240.0 255.255.255.0 Ethernet0/1 149.172.209.10 2
ip route 149.172.245.0 255.255.255.0 Ethernet0/1 149.172.209.10 2
ip route 208.184.121.0 255.255.255.224 Ethernet0/0
!
no logging console
snmp-server community ikospub RO
snmp-server community ikospriv RW
!
line con 0
 exec-timeout 0 0
line aux 0
line vty 0 4
 exec-timeout 20 0
 password 7 000A160300090509
 login
!
no scheduler allocate
end
```

The invention claimed is:

1. A private, secure wide area network using the internet as a backbone between a source site and a destination site, comprising:

a first dedicated signal path to a router of a source ISX/ISP provider of internet access;

a source router located at a source site and having a channel service unit having an output coupled to said first dedicated signal path and having a routing table which has been configured to recognize AlterWAN packets and always route them over said first dedicated signal path to said source ISX/ISP provider, said AlterWAN packets being packets having as their destination address one of one or more predetermined Internet Protocol addresses assigned to an AlterWAN private tunnel, and AlterWAN private tunnel being a data path through the internet which uses only high bandwidth, low latency data paths between predetermined ISX/ISP provider sites which have been pre-tested to ensure that adequate bandwidth and low latency exists for AlterWAN packets and that AlterWAN packets are always routed at said predetermined ISX/ISP provider site into said AlterWAN private tunnel;

a source firewall circuit located at a source site and having a first port for coupling directly or through a local area network to one or more computers or other devices at said source site for which communication over said private, secure wide area network (hereafter WAN) is desired, and having a WAN interface coupled to said source router directly or through a local area network, said source firewall functioning to encapsulate any Internet Protocol packets hereafter IP packets transmitted from said first computer or other device which have a destination Internet Protocol address (hereafter IP address) which is one of a set of "predetermined IP addresses", said predetermined IP addresses" being IP addresses of computers or other devices at a destination site which are assigned to said private tunnel, said encapsulation being performed on the payload sections of IP packets having as their destination address one of said "predetermined IP addresses", hereafter referred to as AlterWAN packets and for encrypting said payload sections of said AlterWAN packets using any encryption method known to a destination firewall at a destination site and transmitting said AlterWAN packets to said source router, but said source firewall for not encapsulating any IP packets transmitted by said first computer or other device which do not have as their destination address one of said "predetermined IP addresses", and for receiving incoming IP packets from various sources including computers and devices at said destination site via said source router and for recognizing AlterWAN packets among these IP packets on the basis that an AlterWAN packet has one of said "predetermined IP addresses" as its destination address, and decrypting the payloads of said AlterWAN packets to recover said IP packets that were encapsulated in said AlterWAN packets and transmitting at least said recovered IP packets to said one or more computers or devices at said source site to which said recovered IP packets are addressed;

one or more internet data paths coupled to routers of said predetermined ISX/ISP providers of internet services, said routers having their routing tables configured to recognize said AlterWAN packets by their destination addresses and to cause said routers to route AlterWAN packets into said AlterWAN private tunnel data path, each said predetermined ISX/ISP provider being a provider of internet services who has contracted to provide routing of AlterWAN packets into said AlterWAN private tunnel data path, said AlterWAN private tunnel data path being at least one of said internet data paths which has been pre-tested to verify that said data path does in fact provide a low hop count data path having an average available bandwidth along each portion of said data path travelled by said AlterWAN packets which exceeds the worst case bandwidth consumption of AlterWAN packet traffic between said source site and said destination site;

a destination router including a channel service unit coupled to or part of said destination router and having a trusted side output, said destination router coupled through said channel service unit and a second dedicated data path to a router of a said participating ISX/ISP provider, said destination router having its routing tables configured to recognize said AlterWAN packets and route them to said trusted side output;

a destination firewall circuit having a WAN interface coupled to said trusted side output of said destination router directly or through a local area network and having a second port for coupling directly or through a local area network to one or more computers or devices for which communication across said private AlterWAN data path is desired, said destination firewall functioning to encapsulate into the payload sections of AlterWAN packets IP packets transmitted from said one or more computers or devices at said destination site and having as their destination addresses one of said "predetermined IP addresses" which is an IP address of said one or more computers or devices at said source site, and functioning to encrypt the payloads of said AlterWAN packets and transmit said AlterWAN packets to said destination router, but for not encapsulating into AlterWAN packets any IP packets transmitted from said one or more computers or devices at said destination site which do not have as their destination address one of said "predetermined IP addresses" and for receiving IP packets from various sources including said one or more computers or devices at said source site via said destination router, and functioning to recognize AlterWAN packets among said received IP packets and decrypt the payload sections of said AlterWAN packets to recover the original IP packets and transmitting at least the decrypted IP packets recovered from AlterWAN packet to said one or more computers or devices at said destination site.

2. A process for sending AlterWAN data packets securely between a computer at a source site and a computer at a destination site so as to implement a private Wide Area Network (hereafter AlterWAN) between said source and destination sites of a customer, said AlterWAN using the internet as a backbone but which is private and which only said customer can use comprising the steps:

receiving at a source firewall incoming Internet Protocol packets (hereafter IP packets) from a computer at a source site of a customer, some of said IP packets having as their destination addresses an Internet Protocol address (hereafter IP address) which is one of one or more IP addresses of one or more computers or other computing devices at a destination site of said customer;

at said source firewall, comparing the destination address in each said received IP packet to an IP address of a computer at said destination site of said customer, and if an IP packet has as its destination address the IP address of a computer or other computing device at said destination site (hereafter referred to as an AlterWAN inner packet), concluding said IP packet is an AlterWAN inner packet which needs to be transmitted to said computer or other computing device at said destination site via a high bandwidth, low latency, low hop count data path using said internet as a backbone and connecting said source site to said destination site and having an average available bandwidth which exceeds the worst case bandwidth consumption of packets traveling between said source site and said destination site (hereafter referred as the AlterWAN data path), but if said destination address of said received IP packet is not an IP address of a computer or other computing device at said destination site, concluding said IP packet is an AlterWAN inner packet and needs to be routed like any other IP packet would be routed;

if said received IP packet is an AlterWAN inner packet, encapsulating said AlterWAN inner packet into the payload section of a second IP packet having as its destination address the IP address of an untrusted side of a firewall at said destination site of said AlterWAN data path (hereafter referred to as composite AlterWAN packet) and encrypting at said source firewall at least a payload portion of said AlterWAN inner packet using any encryption algorithm which can be decrypted by said firewall at said destination site, and forwarding said composite AlterWAN packet to a source router;

if said received IP packet is not an AlterWAN inner packet, forwarding said received IP packet (hereafter referred to as a non-AlterWAN packet) to said source router without encapsulating said non-AlterWAN packet into a composite AlterWAN packet;

at said source router, converting both said composite AlterWAN packets and said non-AlterWAN packets into signals suitable for transmission on a dedicated signal path coupling said source router to a predetermined source participating ISX/ISP provider of internet connectivity and routing services, and transmitting said signals to said predetermined source participating ISX/ISP provider, said predetermined source participating ISX/ISP provider being selected because said provider has available a high bandwidth, low latency, low hop count data path which is part of said AlterWAN data path and also has agreed to route said composite AlterWAN packets into said AlterWAN data path and has routers which either already contain routing statements which will route said AlterWAN packets into said AlterWAN data path or which have been configured to contain such a routing statement or statements.

3. An apparatus comprising:

a dedicated data path for coupling signals to a specially selected first participating ISX/ISP provider of internet access;

a first firewall circuit having a first port for coupling directly or through a local area network to one or more computing devices for which is desired communication over a private wide area network between a customer's source site and destination site using the internet as a backbone, and having a second port, said firewall functioning to use the destination addresses in the headers of each packet received from said one or more computing devices at said source site to distinguish between conventional packets and AlterWAN payload packets, where AlterWAN payload packets are packets having as their destination addresses an address of a computing device at said destination site or said source site, and wherein a computing device at said destination site is coupled to a computer at said source site via a second firewall circuit and an AlterWAN data path comprising of a virtual private network tunnel implemented along a high bandwidth, low latency, low hop count data paths through a public wide area network such as the internet terminating at said source site at an untrusted side of said first firewall circuit and terminating at said destination site at an untrusted side of said second firewall circuit, and wherein conventional packets are packets which are not addressed to any computing device at said destination site, said first firewall circuit functioning to encapsulate said AlterWAN payload packets in the payload section of AlterWAN packets which have as their destination address the address of said untrusted side of said second firewall circuit at said destination end of said virtual private network tunnel, said first firewall circuit further functioning to encrypt the payloads (AlterWAN payload packet) of AlterWAN packets and distinguishing between incoming AlterWAN packets from said destination site and conventional packets by comparing the destination addresses thereof to the address of said untrusted side of said first firewall circuit and concluding that any incoming packets addressed to said first firewall circuit are AlterWAN packet and all packets addressed to one or more computing devices at said source site coupled to said first firewall circuit are conventional packets, and further functioning to decrypt the payload sections of any incoming AlterWAN packets so as to recover the encapsulated AlterWAN payload packet;

a source router having an input coupled to said second port of said first firewall circuit either directly or by a local area network connection, and having a channel service unit having an output coupled to said dedicated data path, said router and channel service unit functioning to receive said AlterWAN packets and said conventional packets from said first firewall circuit and convert said packets into signals suitable for transmission over whatever type of transmission medium is selected for said dedicated data path, and for converting signals received from said dedicated data path into data packets, said source router for transmitting both AlterWAN packets and conventional packets received from said first firewall over said dedicated data path to said specially selected first participating ISX/ISP provider where said AlterWAN packets will be routed via said AlterWAN data path to said second firewall and wherein said AlterWAN data path has an average available bandwidth which substantially exceeds the worst case bandwidth consumption of AlterWAN packets traveling between said source site and said destination site.

4. A method of designing and implementing a private wide area network using the internet as a backbone carrying data packets between a source site to a destination site hereafter referred to as an AlterWAN data path), comprising the steps:

1) selecting source and destination sites that have computers or other devices (hereafter referred to simply as computers) that need to be connected by a wide area network;

2) examining available ISX/ISP internet service providers that can route packets between said source and destination sites and selecting two or more of such ISX/ISP providers as participating ISX/ISP providers including at least a source ISX/ISP provider and a destination ISX/ISP provider through which packet data passing between said source and destination sites will be routed, said selection of said participating ISX/ISP providers being made upon the availability to said participating ISX/ISP providers of one or more high bandwidth, low latency data paths which will form part of said AlterWAN data paths, said participating ISX/ISP providers agreeing to route packets traveling between said source site and said destination site (hereafter AlterWAN packets) into said AlterWAN data path and agreeing to allow route statements to be added to their routers to cause AlterWAN packets to always be routed into said AlterWAN data path, said participating ISX/ISP providers also agreeing to manage their portions of said AlterWAN data path so as to guarantee that the average available bandwidth of their portion of said AlterWAN data path is substantially greater than the worst case bandwidth consumption of AlterWAN packet traffic between said source and destination sites;

3) adding route statements to routers of said participating ISX/ISP providers which will to cause AlterWAN packets to always be routed into said AlterWAN data path and pretesting said ISX/ISP providers selected in step 2 by testing to verify the data path that AlterWAN packets travel will be a portion of said AlterWAN data path and that performance is adequate;

4) contracting to establish and establishing a first dedicated signal path between the output of a source router at which said signals appear and said source ISX/ISP provider in said group of participating ISX/ISP providers selected in step 2, said first dedicated signal path having sufficiently high bandwidth to handle the worst case traffic volume in AlterWAN packets;

5) contracting to provide a second dedicated signal path connecting the input of a destination router to said destination ISX/ISP provider, said second dedicated local loop connection having sufficiently high bandwidth to handle the worst case traffic volume in AlterWAN packets;

6) coupling an untrusted port of a source firewall/virtual private network circuit (hereafter referred to as the source firewall) to a source router and coupling a trusted port of said source firewall to one or more computing device or devices at said source site and configuring said source firewall to examine the destination addresses of a first internet Protocol packet (hereafter IP packet) received from one of one or more computing devices at said source site and encapsulating each first IP packet having as its destination address and address which is a Internet Protocol address (hereafter IP address) of any computing device at said destination site as a payload portion in a second IP packet, said second IP packet hereafter referred to as an AlterWAN packet, said AlterWAN packet having as its destination address the IP address of an untrusted port of a destination firewall/virtual private network circuit (hereafter referred to as the destination firewall) at said destination site and having an encrypted version of at least the payload section of said first IP packet as its payload, said source firewall being configured to recognize non AlterWAN packets and with portions of said AlterWAN packet other than said payload section being referred to herein as an AlterWAN packet header not to encapsulate or encrypt the payload portions of any non AlterWAN packets received from one or more of said devices at said source site which do not have as their destination address an IP address of any device at said destination site, and configuring said source firewall to screen incoming IP packets from said destination firewall so as to recognize any incoming AlterWAN packets which have as their destination addresses the IP address of the untrusted port of said source firewall and to strip off said AlterWAN packet headers and decrypt a payload portion of each said incoming AlterWAN packet to recover the original IP packet transmitted from said destination firewall so as to recover the original IP packet transmitted to said destination firewall by a computer at said destination site, and for outputting said recovered original IP packet to said device or devices at said source site having the IP address which is the destination address of said original IP packet;

7) coupling a source router to receive said AlterWAN packets and non-AlterWAN packets from said source firewall and to convert said AlterWAN and non-AlterWAN packets in a channel service unit to signals suitable for transmission over said first dedicated signal path to said source ISX/ISP provider;

8) providing a destination router at said destination site having a firewall port coupled to an untrusted port of said destination firewall and having a channel service unit coupled to said destination ISX/ISP provider via said second dedicated signal path and configuring said destination router to receive from said second dedicated signal path downstream signals encoding both encrypted AlterWAN packets and conventional non AlterWAN IP packets and convert said signals back into the original digital IP packet form, and configuring said destination router to output said recovered downstream IP packets at said firewall port coupled to said untrusted port of said destination firewall, and configuring said destination router to receive upstream AlterWAN packets and conventional non AlterWAN packets and convert both types of said packets into signals suitable for transmission on said second dedicated signal path coupling said destination router to said participating destination ISX/ISP provider in said group of participating ISX/ISP providers selected in step 2, and configuring said router to transmit said signals on said second dedicated signal path;

9) providing said destination firewall having an untrusted port coupled to said firewall port of said destination router so as to receive said recovered digital IP packets, and configuring said destination firewall to recognize as AlterWAN packets incoming recovered IP packets having as their destination address the IP address of said destination firewall untrusted port and further configuring said destination firewall to strip off said AlterWAN packet header of each said AlterWAN packet and, as to each AlterWAN packet, decrypting a payload portion of said AlterWAN packet so as to recover said first IP packet which encapsulated in said AlterWAN packet, and configuring said destination firewall to output said first IP packet recovered from said AlterWAN packet by said decryption process and output each said first IP packet so recovered at an output coupled to one or more computing devices at said destination site, and configuring said destination firewall to examine the destination addresses of upstream first IP packets received from said one or more computing devices at said destination site and encapsulate each upstream first IP packet addressed to any computer or other computing device at said source site as a payload portion of a second IP packet, hereafter referred to as an upstream AlterWAN packet (an AlterWAN packet traveling from said destination site toward said source site), each said upstream AlterWAN packet having as its destination address the IP address of said untrusted port of said source firewall at said source site and a first IP packet as its payload, and further configuring said destination firewall to encrypt the payload portions of each said upstream AlterWAN packet but not to encapsulate or encrypt payload portions of any non AlterWAN IP packets received from said one or more computing devices at said destination site, said non AlterWAN IP packets being those IP packets which do not have as their destination addresses an IP address of any device at said source site, and configuring said destination firewall to transmit said encrypted upstream AlterWAN packets and said conventional non AlterWAN packets to said destination router via said untrusted port.

5. A private wide area network connecting a customer source site to a customer destination site and using the internet as a backbone, comprising:

a first dedicated data path coupled to a first participating ISX/ISP provider of internet access;

a source router having a channel service unit having an output coupled to said first dedicated data path and configured with route statements that recognize IP packets addressed to the untrusted side of a destination firewall at said customer destination site (hereafter outgoing AlterWAN packets) and cause said outgoing AlterWAN packets to be routed into an AlterWAN data path, wherein said AlterWAN data path is a high bandwidth, low latency data path from said customer source site to said customer destination site and back having an average available bandwidth that exceeds the worst case bandwidth consumption of AlterWAN packet traffic between said source and destination sites;

a source firewall having a first port for coupling directly or through a local area network to one or more devices at a customer source site, and having an untrusted port coupled to said source router directly or through a local area network, said untrusted port of said source firewall having an Internet Protocol address (hereafter IP address), said source firewall functioning to receive Internet Protocol packets (hereafter IP packets) from said one or more devices at said customer source site which are addressed to one or more devices at a customer destination site (hereafter AlterWAN payload packets) and other IP packets addressed to other locations on the internet (hereafter conventional IP packets), and for encapsulating said AlterWAN payload packets as the payload sections of outgoing AlterWAN packets which have as their destination addresses the IP address of an untrusted port of a destination firewall at said customer destination site (hereafter outgoing AlterWAN packets) and functioning to encrypt the payloads of said outgoing AlterWAN packets, and for receiving incoming IP packets and comparing the destination addresses of said incoming IP packets to said IP address of said untrusted port of said source firewall circuit any said incoming IP packet having as its destination address the IP address of said untrusted port of said source firewall being an incoming AlterWAN packet, each said incoming AlterWAN packet encapsulating as its payload section a AlterWAN payload packet, and decrypting the payload sections of any incoming AlterWAN packets so as to recover the encapsulated AlterWAN payload packet from each incoming AlterWAN packet, and transmitting each recovered AlterWAN payload packet to a device at said customer source site to which said AlterWAN payload packet is addressed;

one or more routers of participating ISX/ISP providers of internet services including a router at an endpoint participating ISX/ISP provider, said routers of said ISX/ISP providers functioning to implement said AlterWAN data path as a high bandwidth, low latency, low hop count data path having an average available bandwidth that exceeds the worst case bandwidth consumed by incoming and outgoing AlterWAN packets traveling between said source and destination sites and configured to recognize said incoming and outgoing AlterWAN packets by their destination addresses and route them into said AlterWAN data path, a destination router including a channel service unit coupled to or part of said destination router, said destination router coupled through said channel service unit and a second dedicated datapath to said router of said endpoint participating ISX/ISP provider and configured to recognize said outgoing AlterWAN packets arriving from said endpoint participating ISX/ISP provider which have traveled from said source firewall via said AlterWAN data path and route them to said destination firewall, and configured to recognize said incoming AlterWAN packets from said destination firewall circuit and route them to said endpoint participating ISX/ISP provider;

said destination firewall circuit having an untrusted port having an IP address to which said outgoing AlterWAN packets are addressed, said untrusted port coupled to said destination router directly or through a local area network and having a second port for coupling directly or through a local area network to one or more devices at said customer destination site, said destination firewall circuit configured so as to receive IP packets from said one or more devices at said customer destination site which are addressed to one or more devices at said customer source site (hereafter AlterWAN payload packets) and functioning to receive other conventional IP packets not addressed to any of the said devices at said customer source site, and for encapsulating said AlterWAN payload packets as the payload sections of AlterWAN packets addressed to said IP address of an untrusted port of said source firewall circuit at said customer source site (hereafter incoming AlterWAN packets) and functioning to encrypt the payloads of said incoming AlterWAN packets and for receiving incoming AlterWAN packets and comparing the destination addresses of said incoming AlterWAN packets to said IP address of said untrusted port of said destination firewall circuit, and decrypting the payload sections of any incoming AlterWAN packets having as their destination address the IP address of said untrusted port of said destination firewall circuit so as to recover the encapsulated AlterWAN payload packet from each incoming AlterWAN packet, and transmitting each recovered AlterWAN payload packet to the device to which it is addressed at said customer destination site.

6. A method of doing business to establish a private bidirectional wide area network between a source site and a destination site using the internet as a backbone, comprising the steps:

connecting one or more computing devices at a source site to a firewall and source router and obtaining a known IP address for each computing device at said source site;

connecting one or more computing devices at a destination site to a firewall and destination router and obtaining a known IP address for each computing device at said destination site;

selecting one or more participating ISX/ISP internet service providers which have one or more high bandwidth, low latency, low hop count data paths that can be used as at least part of a high bandwidth, low latency, low hop count data path for transmission of AlterWAN data packets between said source site and said destination site (hereafter referred to as the AlterWAN data path), and making agreements with said participating ISX/ISP internet service providers to always route AlterWAN packets into said AlterWAN data path such that said AlterWAN data packets will only travel on AlterWAN data path, wherein said AlterWAN packets are defined as packets which contain as a destination address one of said known IP addresses of computing devices at said source site or said destination site, and ensuring that said routing tables of routers of said one or more participating ISX/ISP internet service providers either already contain routing statements that will cause AlterWAN packets to be routed into said AlterWAN data path or are modified to contain such route statements;

connecting said source router and said destination router to one of said participating ISX/ISP internet service providers through dedicated high bandwidth, low latency data paths.

7. A method comprising:

generating an Internet Protocol data packet (hereafter IP packet) having as its destination address an Internet Protocol address assigned to a computing device at the other end of a private, wide area network using the internet as a backbone (hereafter referred to as an AlterWAN private tunnel);

encrypting a payload portion of said IP packet to generate an encrypted IP packet;

generating a composite AlterWAN packet by encapsulating said encrypted IP packet in another IP packet having as its destination address an IP address of an untrusted side of a firewall which is at a destination site which is part of said AlterWAN private tunnel; and routing said composite AlterWAN packet using a source router whose routing table has been configured to include a routing statement which recognizes said destination address of said composite AlterWAN packet and routes said composite AlterWAN packet via a dedicated data path to an AlterWAN data path, said AlterWAN data path being defined as a high bandwidth, low latency, low hop count data path provided by one or more participating ISX/ISP internet service providers that links said source site and said destination site of said AlterWAN private tunnel, each participating ISX/ISP internet service provider being one which has been selected as having at least one high bandwidth, low latency, low hop count data path which can be used to transmit said composite AlterWAN data packet either from said source site to said destination site or to another participating ISX/ISP internet service provider and which has routers which either already contain or which are configured to contain predetermined routing statements when said participating ISX/ISP agrees to provide routing services as part of said AlterWAN data path, said predetermined routing statements being ones which will recognize said IP destination address of each said composite AlterWAN data packets and cause said composite AlterWAN packets to be routed into said AlterWAN data path.

8. A method of doing business comprising:

selecting one or more participating ISX/ISP internet service providers which have one or more high bandwidth, low latency, low hop count data paths that can be used as at least part of a high bandwidth, low latency, low hop count data path for transmission of composite AlterWAN data packets between a source site and a destination site of a private wide area network using the internet as a backbone (hereafter referred to as the AlterWAN data path), where composite AlterWAN data packets are defined as internet protocol packets (hereafter the outer packet) which encapsulate other internet protocol packets (hereafter the inner packet), said inner packet having as its destination address the IP address of a computing device at one end of said AlterWAN data path and at least the payload section of said inner packet being encrypted, said outer packet having as its destination address an IP address of an untrusted side of a firewall at the same end of said AlterWAN data path as said computing device which has as its IP address said destination address of said inner packet;

making agreements with said participating ISX/ISP internet service providers to always route composite AlterWAN packets into said AlterWAN data path such that said composite AlterWAN data packets will only travel on said AlterWAN data path;

ensuring that said routing tables of routers of said one or more participating ISX/ISP internet service providers either already contain routing statements that will cause said composite AlterWAN data packets to be recognized and routed into said AlterWAN data path or are modified to contain such route statements.

9. A method of doing business comprising:

selecting one or more participating ISX/ISP internet service providers which have one or more high bandwidth, low latency, low hop count data paths that can be used as at least part of a high bandwidth, low latency, low hop count data path for transmission of AlterWAN data packets between a source site and a destination site of a wide area network using the internet as a backbone (hereafter referred to as the AlterWAN data path), where AlterWAN data packets are defined as internet protocol packets which contain as a destination address one of said known IP addresses of computing devices at said source site or said destination site;

making agreements with said participating ISX/ISP internet service providers to always route said AlterWAN packets into said AlterWAN data path such that said AlterWAN data packets will only travel on said AlterWAN data path;

ensuring that said routing tables of routers of said one or more participating ISX/ISP internet service providers either already contain routing statements that will cause said AlterWAN data packets to be recognized and routed into said AlterWAN data path or are modified to contain such route statements.

* * * * *

UNITED STATES PATENT AND TRADEMARK OFFICE
CERTIFICATE OF CORRECTION

Page 1 of 2

PATENT NO. : 7,111,163 B1
APPLICATION NO. : 09/613004
DATED : September 19, 2006
INVENTOR(S) : Richard D. Haney It is certified that error appears in the above-identified patent and that said Letters Patent is hereby corrected as shown below:

In the Specification

The following should appear following (column 28) and prior to the start of the claims (column 29):

"IKOS-UK#sh conf
!
version 12.0
service timestamps debug uptime
service timestamps log uptime
no service password-encryption
service udp-small-servers
service tcp-small-servers
!
hostname IKOS-UK
!
no logging buffered
enable password uk-47587
!
ip subnet-zero
ip domain-name ikos.com
ip name-server 149.172.204.101
ip name-server 149.172.208.100
clock timezone est - 11
clock summer-time edt recurring
!
!!
interface Ethernet0
ip address 195.14.71.225.255.255.255.248
ip broadcast-address 195.14.71.239

Signed and Sealed this
Twenty-first Day of April, 2015

Michelle K. Lee
*Director of the United States Patent and Trademark Office*

CERTIFICATE OF CORRECTION (continued)
U.S. Pat. No. 7,111,163 B1

```
ip directed-broadcast
!
interface Serial0
bandwidth 384
no ip address
ip directed-broadcast
encapsulation ppp
shutdown
!
interface Serial1
bandwidth 384
ip address 195.14.66.98.255.255.255.252
ip directed-broadcast
!
ip classless
iproute 0.0.0.0. 0.0.0.0 Serial1
!
snmp-server community public RO
!
line con 0
exec-timeout 0 0
transport input none
line aux 0
transport input all
line vty 0 4
exec timeout 20 0
password intl2getin
login
!
ntp clock-period 17179866
end
```

<div style="text-align:center;">
UK DESTINATION ROUTER SETUP<br>
APPENDIX D"
</div>